No. 794,153. Patented July 4, 1905.

UNITED STATES PATENT OFFICE.

CHARLES S. PRICE, OF WESTMONT, PENNSYLVANIA.

UTILIZATION OF FLUE-DUST.

SPECIFICATION forming part of Letters Patent No. 794,153, dated July 4, 1905.

Application filed May 31, 1904. Serial No. 210,424.

*To all whom it may concern:*

Be it known that I, CHARLES S. PRICE, a citizen of the United States, and a resident of the borough of Westmont, in the county of Cambria and State of Pennsylvania, have invented certain new and useful Improvements in the Utilization of Flue-Dust; and I do hereby declare the following to be a full, clear, and exact description of the invention, such as will enable others skilled in the art to which it appertains to make and use the same.

In the operation of blast-furnaces, especially those using fine ores, large quantities of ore-dust are carried over into the downcomers, dust-catchers, flues, and passages, and not only is this fine ore or so-called "flue-dust" wasted, but it must be removed at a considerable expense, and therefore is a serious item of loss. This flue-dust, although rich in iron, is too fine to be recharged into the blast-furnace and smelted, because the rush of gases caused by the powerful air-blast in the furnace will carry most of it out again into the flues. Attempts have been made to utilize this valuable dust by mixing it with binding material and briqueting the resulting mixture; but this method, although reasonably successful for small quantities, particularly of precious ores, is entirely too expensive when it is desired to handle the large quantities of flue-dust that result from the operation of a modern blast-furnace.

The object of my invention is to provide means for utilizing the blast-furnace flue-dust by putting it cheaply in such form that when charged into the furnace it will be reduced in due course of the operation and will not be blown out again. I attain this object by mixing a certain quantity of the flue-dust with a small portion of clay in a pug-mill or any other contrivance that will effect a thorough mixing of the ingredients. This mixture is moistened with water and may be formed into bricks or lumps in an ordinary auger brick-machine or similar apparatus. The clay may be in lumps or other natural condition; but I prefer to use ground clay, as it permits the mixture to be made more easily. I have found by actual trial and experiment that this mixture of clay and iron ore or flue-dust when made into plastic and coherent lumps by the addition of just enough water for this purpose may be charged directly into the blast-furnace with good results, thereby obviating the necessity and expense of molding or pressing it into brick form or of drying it in an oven or otherwise. This method of using the moistened plastic mixtures in lump form is conducive to economy in the highest degree and renders commercially possible the utilization of flue-dust and similar materials, which could not be accomplished otherwise by reason of the expense connected with a more complicated and lengthy operation. The proportion of flue-dust to clay may of course be varied, according to the iron contents of the flue-dust, its coarseness, and other properties, which can readily be determined by experiment, and I have found by trial that a mixture of four parts of flue-dust to one of clay works well with the materials that I have used.

The mixture made according to my improved process contains generally about fifteen to twenty per cent. of moisture and sufficient clay to provide a compound that will not be blown out as dust after it is charged into the blast-furnace.

The amount of clay, which is exceedingly small compared with the total charge of the furnace, is useful in serving to increase the quantity or regulate the quality of cinder, as required in many cases, and it is much easier to smelt than the lean ores which are sometimes used for the same purpose, as will readily be understood by those skilled in the art of smelting ores. The clay being a silicate of alumina contains more silica than alumina, and a quality that I have found satisfactory contains about sixty-two per cent. of $SiO_2$ and eighteen per cent. of $Al_2O_3$, with moisture and a few other substances. Furthermore, the clay does not injure the lining of the furnace, nor does it produce any other deleterious effects, while the saving in ore cost more than offsets the extra cost of coke and limestone required to smelt the added clay.

It will be readily understood that my improved process is applicable to the treatment of fine ores as well as flue-dust and that the process may be modified without departing from the principles of this invention as defined in the annexed claims. By "fine" ores I mean ores in such a minute state of division as to be unsuitable for directly charging into a smelting-furnace.

Having thus described my invention, what I claim, and desire to secure by Letters Patent, is—

1. The process of utilizing finely-divided ore or flue-dust, which consists in mixing the same with clay and water in proportions to make stiff, plastic lumps and charging said lumps in a blast-furnace while in a stiff, plastic condition.

2. The process of utilizing finely-divided ore or flue-dust which consists in mixing approximately four parts of the same with one part of clay, sufficient water to make a stiff mass, forming same into plastic and coherent masses or plastic lumps, and charging said lumps into a blast-furnace.

In testimony whereof I hereto affix my signature in the presence of two witnesses.

CHARLES S. PRICE.

Witnesses:
   J. R. WEMLINGER,
   STONE EDELEN.